United States Patent
Heckler

(10) Patent No.: US 10,253,923 B2
(45) Date of Patent: Apr. 9, 2019

(54) FLOOR STAND FOR FLAT PANEL DISPLAY

(71) Applicant: Hecktech, Inc., Phoenix, AZ (US)

(72) Inventor: Dean Heckler, Phoenix, AZ (US)

(73) Assignee: HECKTECH, INC., Phoenix, AZ (US)

( * ) Notice: Subject to any disclaimer, the term of this patent is extended or adjusted under 35 U.S.C. 154(b) by 0 days.

(21) Appl. No.: 15/704,504

(22) Filed: Sep. 14, 2017

(65) Prior Publication Data

US 2018/0080599 A1 Mar. 22, 2018

Related U.S. Application Data

(60) Provisional application No. 62/395,868, filed on Sep. 16, 2016, provisional application No. 62/453,824, filed on Feb. 2, 2017.

(51) Int. Cl.
*F16M 11/22* (2006.01)
*F16M 11/42* (2006.01)
*F16M 11/04* (2006.01)

(52) U.S. Cl.
CPC ............. *F16M 11/22* (2013.01); *F16M 11/04* (2013.01); *F16M 11/42* (2013.01); *F16M 2200/08* (2013.01)

(58) Field of Classification Search
CPC .... F16M 11/22; F16M 11/20; F16M 11/2028; F16M 11/04; F16M 11/42;

(Continued)

(56) References Cited

U.S. PATENT DOCUMENTS

| | | | | | |
|---|---|---|---|---|---|
| 2,965,305 | A | * | 12/1960 | Glazer | B60S 3/044 134/123 |
| 3,007,269 | A | * | 11/1961 | Jump | E01F 9/688 248/158 |
| 3,809,345 | A | * | 5/1974 | Tebbe | A01G 5/04 248/27.8 |
| 4,951,906 | A | * | 8/1990 | Morey | G09F 7/18 248/201 |

(Continued)

FOREIGN PATENT DOCUMENTS

GB 2419085 A 4/2006

*Primary Examiner* — Nkeisha Smith
(74) *Attorney, Agent, or Firm* — Hartman Titus PLC; John D. Titus

(57) ABSTRACT

A floor stand for flat panel display is formed from a horizontal section of square tubing, which forms a support beam. One of the upward-facing surfaces has a series of holes spaced at regular intervals corresponding to the Video Electronics Standards Association (VESA) standard horizontal spacing specification for mounting flat panel displays. A pair of vertical support columns attach to the horizontal beam. The forward surfaces of the vertical support columns each have as series of holes spaced at regular intervals corresponding to the Video Electronics Standards Association (VESA) standard vertical spacing specification for mounting flat panel displays. In use, the vertical support columns are attached to the horizontal beam at a separation distance equal to the horizontal spacing of the mounting pattern for the user's selected flat panel display. The base of each of the vertical support columns is formed into a claw-shaped attachment that corresponds to the outside surface of the horizontal beam, so that the vertical support columns are keyed to the beam. The vertical support columns are also formed so the center of mass of the flat panel display is behind the centerline of the horizontal beam. This ensures the flat panel display does not tip forward before it can be secured to the beam.

4 Claims, 5 Drawing Sheets

(58) Field of Classification Search
CPC ........... F16M 2200/08; F16M 2200/00; F16M 2200/06; G06F 1/1601; G06F 1/1643; H05K 5/0004; H05K 5/02; H05K 5/0017; H05K 5/0217
USPC ......... 248/176.3, 188.1, 188.8, 188.7, 163.1, 248/440.1, 129, 688, 346.01, 346.03, 917, 248/919–924
See application file for complete search history.

(56) References Cited

U.S. PATENT DOCUMENTS

| | | | | |
|---|---|---|---|---|
| 4,988,063 | A | * | 1/1991 | Pucillo .................. B05B 15/625 248/83 |
| 5,040,321 | A | * | 8/1991 | Stoudt ................. G09F 15/0018 248/166 |
| 5,481,846 | A | * | 1/1996 | Macchietto ............... E04C 3/32 248/158 |
| 5,598,996 | A | * | 2/1997 | Rath .......................... F41J 1/10 248/163.1 |
| 6,926,238 | B1 | * | 8/2005 | Blessing ................... B64F 5/50 248/129 |
| 2006/0225962 | A1 | | 10/2006 | Underhill et al. |
| 2009/0057501 | A1 | | 3/2009 | Huang |
| 2010/0012795 | A1 | * | 1/2010 | Spencer ................... A63G 9/00 248/121 |
| 2014/0168527 | A1 | | 6/2014 | Tang et al. |
| 2014/0231600 | A1 | * | 8/2014 | Carmichael .......... A47B 23/042 248/121 |
| 2017/0146182 | A1 | * | 5/2017 | Fang ..................... F16M 11/22 |

\* cited by examiner

FLOOR STAND FOR FLAT PANEL DISPLAY

BACKGROUND OF THE INVENTION

This invention relates generally to television stands and, in particular, mounting apparatus for flat panel displays.

The Flat Display Mounting Interface (FDMI), also known as VESA Mounting Interface Standard, is a family of standards defined by the Video Electronics Standards Association for mounting flat panel monitors, TVs, and other displays to stands or wall mounts. The mounting standard requires that the display have a rectangular pattern of four tapped holes, usually ISO size M6 or M8. Typical VESA mounting patterns for large flat panel displays (more than 31 inch diagonal) are square with a spacing of 200 mm×200 mm, 300 mm×300 mm up to 1000 mm×1000 mm in 100 mm increments.

Conventional floor stands for large flat panel displays typically comprise a vertical pole with a VESA adapter mounted to the pole. The VESA adapter consists of a rigid flat rectangular frame with holes cut to match a variety of VESA patterns together with a clamp or other mechanism to attach the VESA adapter to the pole. The adapter is attached to the display using four of the fixed holes in the adapter. The adapter is then attached to the pole at the appropriate height for the particular display and clamped or pined to the pole to hold it in place. This makes for a complicated and unnecessarily cumbersome mounting arrangement with many parts.

SUMMARY OF THE INVENTION

The present invention comprises a floor stand for supporting a flat panel display. According to an illustrative embodiment, the floor stand is formed from a horizontal section of square tubing, which forms a support beam. One of the upward-facing surfaces has a series of holes spaced at regular intervals corresponding to the Video Electronics Standards Association (VESA) standard horizontal spacing specification for mounting flat panel displays. A pair of vertical support columns attach to the horizontal beam. The forward surfaces of the vertical support columns each have as series of holes spaced at regular intervals corresponding to the Video Electronics Standards Association (VESA) standard vertical spacing specification for mounting flat panel displays. In use, the vertical support columns are attached to the horizontal beam at a separation distance equal to the horizontal spacing of the mounting pattern for the user's selected flat panel display. A hitch pin and/or setscrew holds the vertical support column in place. The flat panel display is then lifted to the desired height and attached to the vertical support columns using the required number (usually four) of the holes formed in the vertical support columns. Alternatively, the vertical support columns are first attached to the flat panel display and the assembly lifted onto the horizontal beam. The base of each of the vertical support columns is formed into a claw-shaped attachment that corresponds to the outside surface of the horizontal beam, so that the vertical support columns are keyed to the beam. The vertical support columns are also formed so the center of mass of the flat panel display is behind the centerline of the horizontal beam. This ensures the flat panel display does not tip forward before it can be secured with the hitch pin and/or setscrew.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
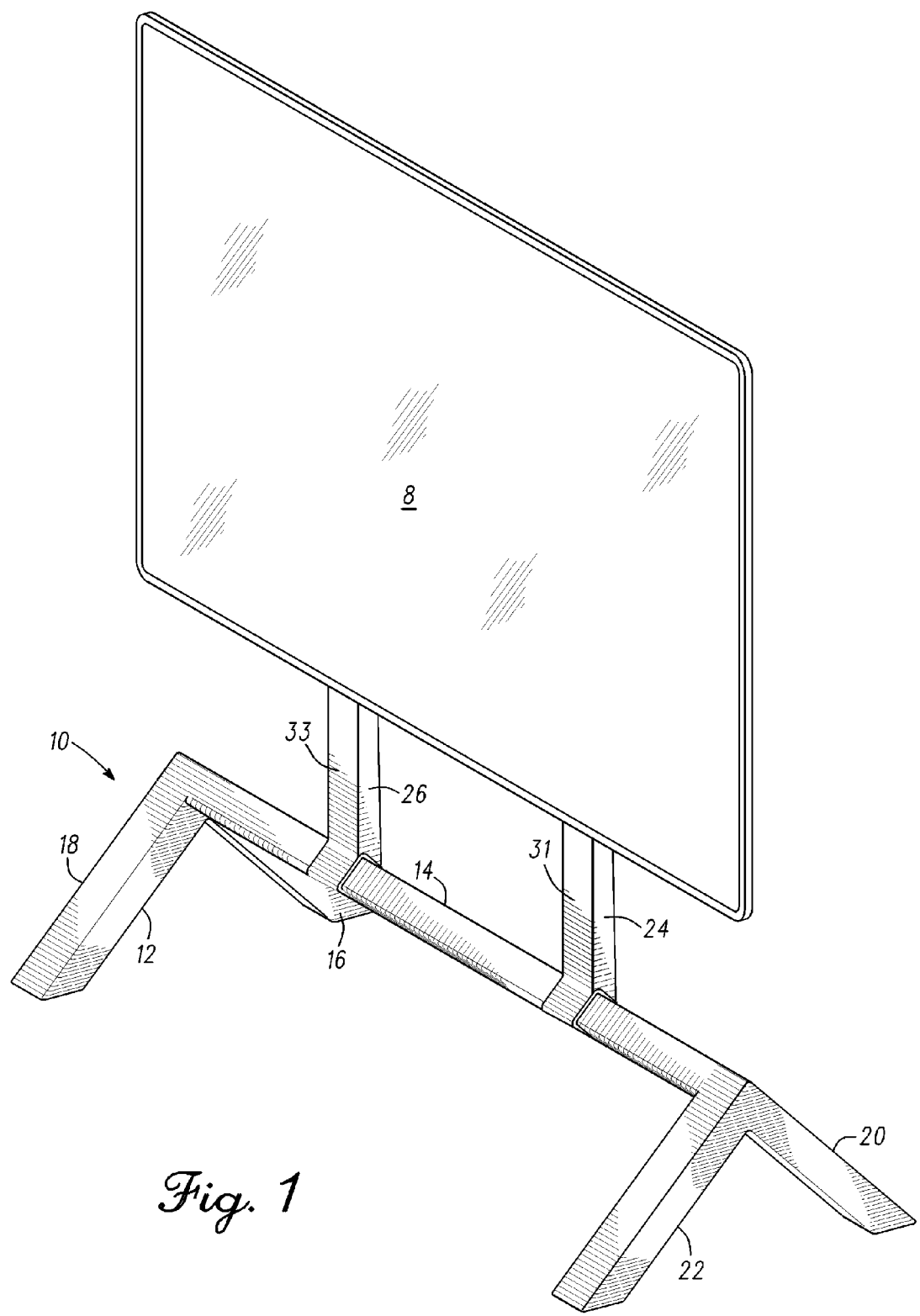
FIG. 1 is a front perspective view of a floor stand for flat panel display incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

In accordance with the present invention and with reference to FIG. 1, floor stand 10 for supporting a large flat panel display 8, comprises a base 12. Base 12 may be a unitary structure formed by welding sections of rectangular or square cross-sectional tubing together to form a horizontal beam section 14 and four angularly disposed legs 16, 18, 20 and 22, or may be assembled with fasteners. Although in the illustrative embodiment, legs 16, 18, 20 and 22 are angularly disposed, the invention is not limited to any particular arrangement of legs, including an inverted "U" or "T" shaped leg arrangement. Additionally, the invention is not limited to any particular size of tubing.

Figure 2:
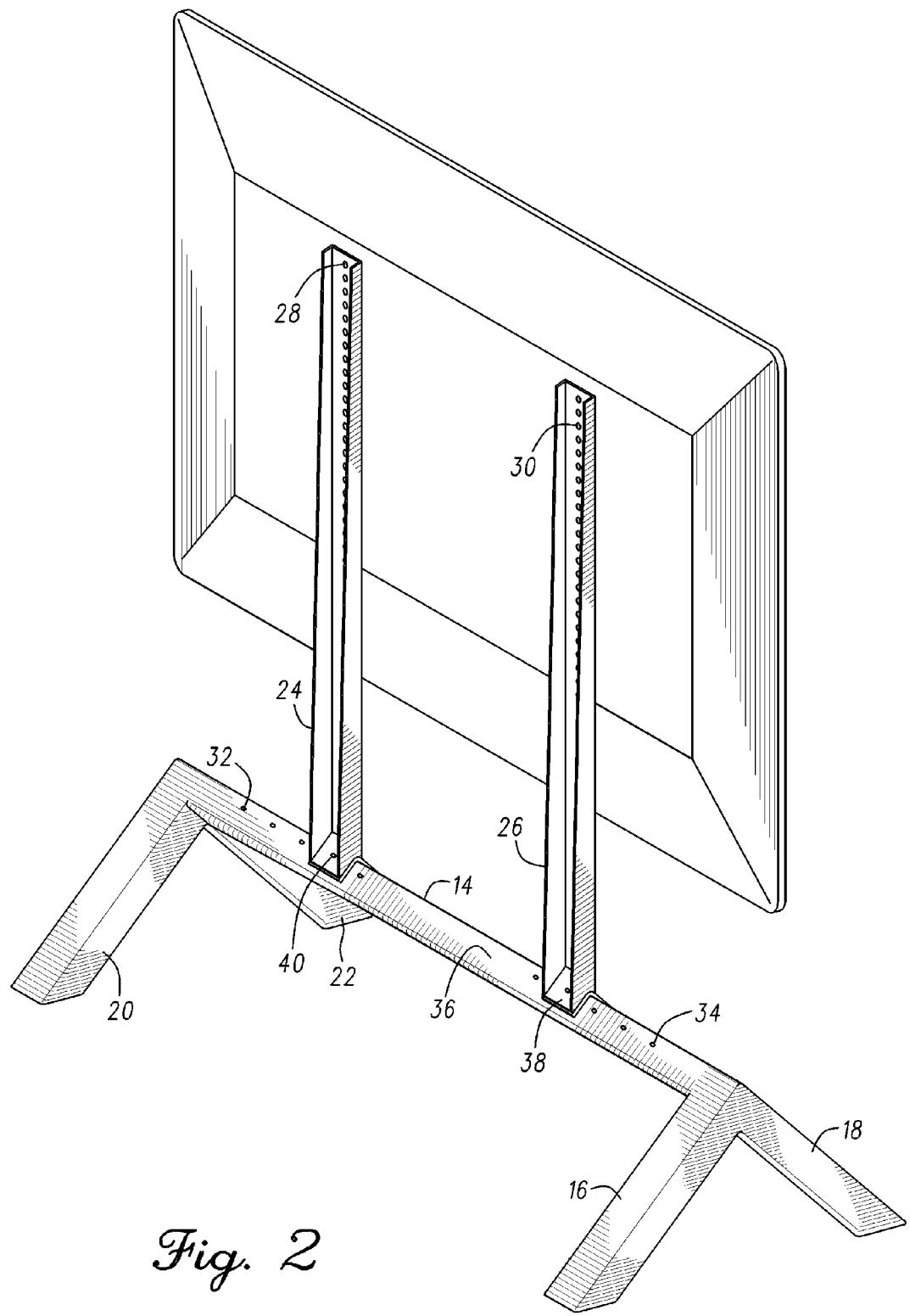
FIG. 2 is a rear perspective view of the floor stand of FIG. 1.

With reference to FIG. 2, floor stand 10 further comprises a pair of vertical support columns 24 and 26. Each of columns 24 and 26 have a plurality of holes 28, 30 spaced evenly along the vertical centerline. Holes 28, 30 are arranged to match the vertical spacing of a standard VESA hole pattern (e.g. 300 mm, 400 mm, 500 mm apart) centered along a plurality of horizontal centerlines to enable the user to have a choice of mounting heights for the flat panel display. The spacing also allows a display to be mounted sideways (portrait orientation) provided the display has a standard VESA hole pattern that is within the range accommodated by columns 24 and 26.

Figure 3:
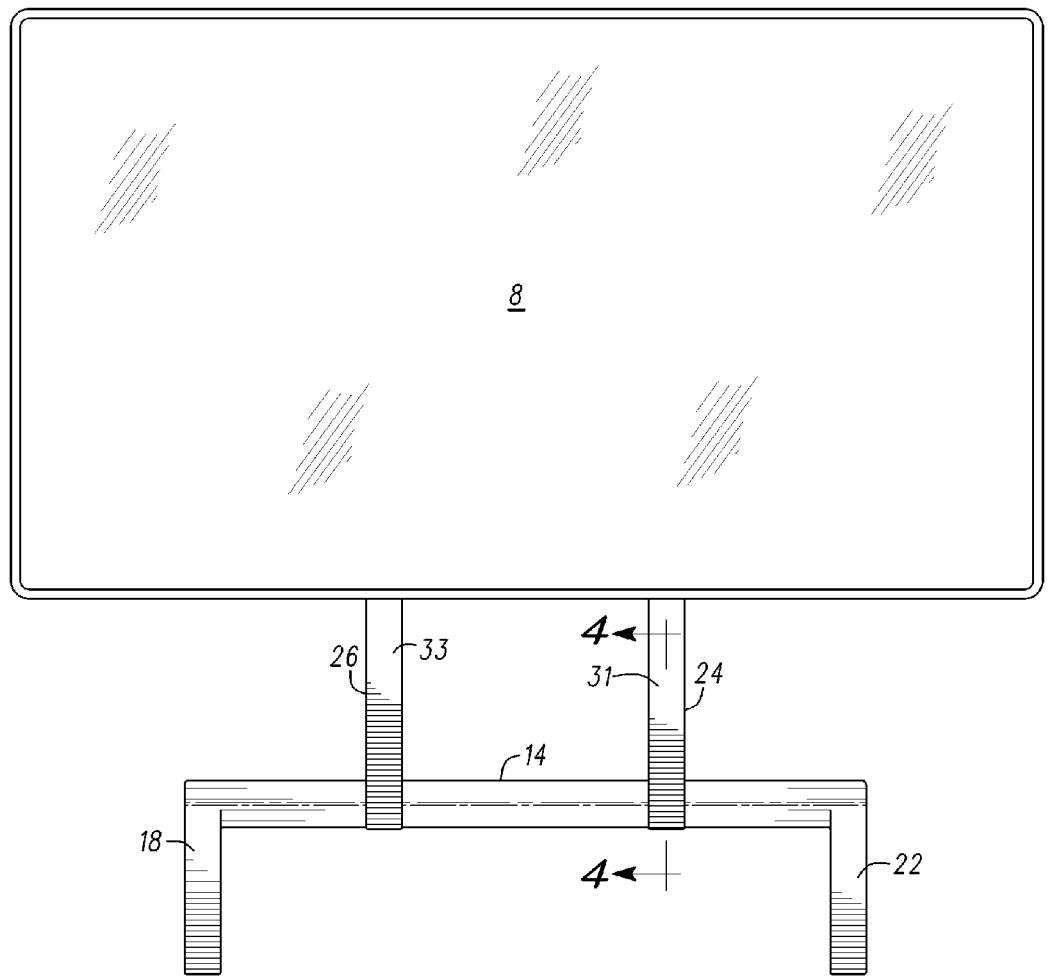
FIG. 3 is a front view of the floor stand of FIG. 1.
Figures 4, 6:
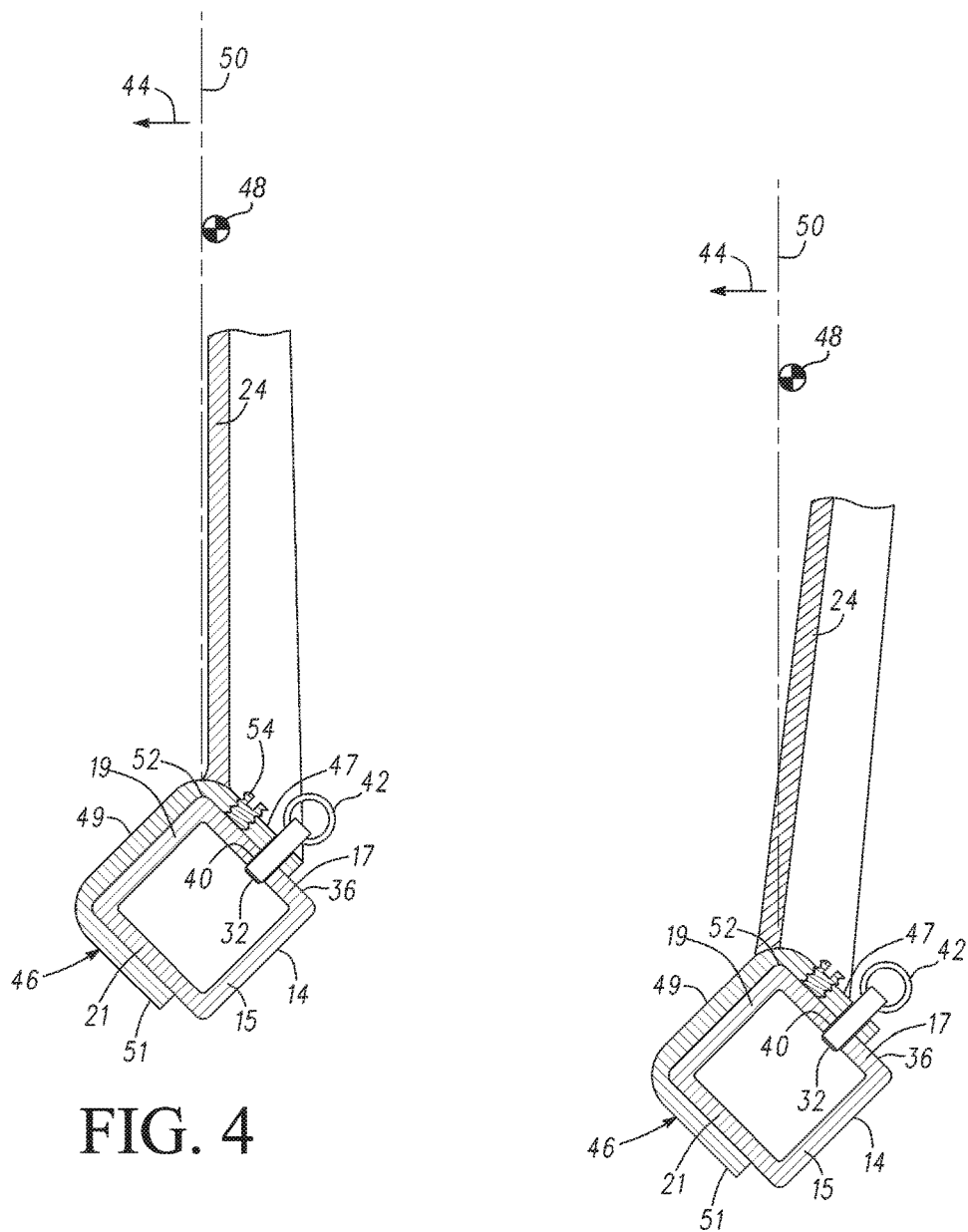
FIG. 4 is a cross-sectional view of a portion of the floor stand of FIG. 1 taken along line 4-4.
FIG. 6 is a cross-sectional view of an alternative embodiment.

With additional reference to FIGS. 3 and 4, horizontal beam 14 has a generally rectangular, preferably square cross section arranged so that the sides of the rectangle 15, 17, 19, 21 are on an acute angle relative to the ground, preferably each is at a 45° angle relative to the floor. Horizontal beam further includes a plurality of holes 32, 34 disposed along one of the upward facing surfaces 36. Holes 32 and 34 are arranged to match the horizontal spacing of a standard VESA hole pattern (e.g. 300 mm, 400 mm, 500 mm apart) centered along the length of horizontal beam 14. Columns 24 and 26 each have a central hole 38, 40 at the base end. As shown most clearly in FIG. 4, a hitch pin 42 is inserted through hole 40 to engage one of holes 32 formed in horizontal beam 14 to hold vertical column 24 in registry with hole 32. A similar arrangement holds vertical column 26 in registry with one of the plurality of holes 34. The holes 32 are arranged so that when each of the vertical columns 24 and 26 are in registry with one of the holes 32, the span between the center line of column 24 and column 26 (and therefore the horizontal spacing between the holes 28, 30) is equal to the horizontal spacing of a standard VESA hole pattern.

Each of vertical support columns 24, 26 include a claw portion 46 having a generally rectangular interior profile sized to match the rectangular profile of horizontal beam section 14. The sides 47, 49, 51 of claw portion 46 are also arranged to match the angles of sides 17, 19 and 21 of horizontal beam section 14, so that vertical support columns 24, 26 extend substantially vertically, when claw portion 46 is engaged with horizontal beam section 14. Hitch pin 42 additionally secures vertical column 26 against forward rotation (indicated by arrow 44), while claw portion 46 of column 24 secures vertical column 26 against rearward rotation. It should be observed also that column 26 is fashioned so that the center of mass 48 of the flat panel display 8 is rearward of a vertical axis 50 passing through the apex 52 of horizontal beam 14. This may be accomplished, for example, by offsetting the mounting surface of column 26 rearward compared with apex 52 as shown in FIG. 4, or by mounting column 26 so that it is angled rearward relative to the vertical axis passing through apex 52 as shown in FIG. 6. This configuration ensures that flat panel display does not fall forward by itself before the user can insert hitch pin 42. For additional security, a setscrew 54 may be threaded through the base of vertical column 24 to engage the upward-facing surface 36 of horizontal beam 14.

Figure 5:
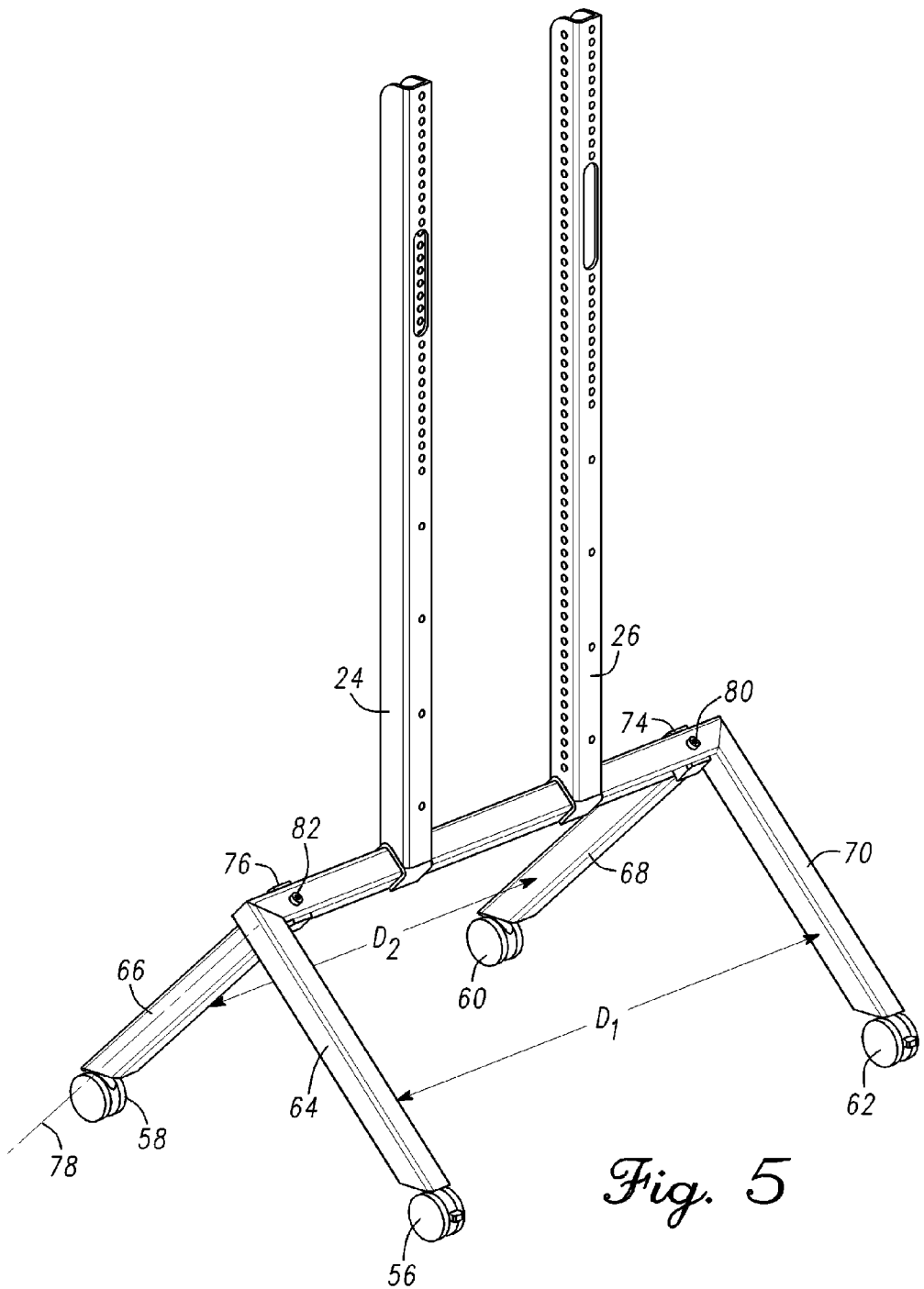
FIG. 5 is a front perspective view of an alternative embodiment of a floor stand for flat panel display.

In an alternative embodiment as shown in the FIG. 5, castor wheels 56, 58, 60, 62 are added to the lower ends of legs 64, 66, 68, 70 to enable the floor stand 72 to be moved. In the embodiment of FIG. 5, the legs of the stand 72 are staggered with the rear legs offset inward so that the distance D1 between front legs 64 and 70 is greater than the distance D2 between rear legs 66 and 68. Alternatively, instead of the rear legs, the front legs could be staggered inward so that D1 is less than D2. This enables the stands 72 to nest together with, e.g. the inwardly-staggered rear legs 66, 68 of one stand 72 passing between the front legs 64, 70 of an adjacent stand. The stand may be equipped with horizontal supports (not shown) having slots adapted to be attached to a standard VESA hole pattern to enable two screens to be mounted side-by-side on the stand. Rear legs 66, 68 may also be made to be removable, which allows the stand 72 to be shipped and/or stored in a flat box. In the illustrative embodiment of FIG. 5, the rear leg attaches with a claw portion in a manner similar to vertical column 24, except the rectangular C-shaped claw opening 74, 76 opens parallel to the longitudinal axis 78 of the leg 66, 68. A threaded fastener 80, 82 is inserted through horizontal beam 14 to secure each rear leg.

Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, references to direction such as "up" or "down" as well as recited materials or methods of attachment are intended to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____").

What is claimed is:

1. A stand (10, 72) for supporting a flat panel display (8) comprising:
a horizontal beam (14) supported by a plurality of downward-extending legs (16, 18, 20, 22, 64, 66, 68, 70) the horizontal beam (14) having a rectangular cross section with four sides (15, 17, 19, 21), each of the four sides (15, 17, 19, 21) being disposed at an acute angle relative to the ground, the horizontal beam (14) further comprising a plurality of holes (32, 34) spaced at regular intervals in an upper surface (36) of the horizontal beam (14);
first and second vertical support columns (24, 26), each of said first and second vertical support columns (24, 26) comprising a plurality of holes (28, 30) spaced at regular intervals along a front surface (31, 33) thereof, the first and second vertical support columns (24, 26) further comprising a claw portion (46) comprising a substantially rectangular C-shaped opening sized to engage three of the four sides (15, 17, 19, 21) of the horizontal beam (14), the claw portion (46) having sides (47, 49, 51) each disposed at an acute angle relative to a vertical axis (50) extending vertically from the horizontal beam (14), whereby the first and second vertical support columns (24, 26) extend substantially vertically when claw portion (46) is engaged with horizontal beam (14).

2. The stand (10, 72) of claim 1, wherein:
the plurality of downward-extending legs (16, 18, 20, 22, 64, 66, 68, 70) comprise rear legs (66, 68) and front legs (64, 70), the front legs (64, 70) being spaced apart a first predetermined distance, the rear legs (66, 68) being spaced apart a second predetermined distance, the second predetermined distance being less than the first predetermined distance, whereby the stand (10, 72) is capable of nesting with a second stand (10, 72).

3. The stand (10, 72) of claim 1, wherein:
the front surfaces (31, 33) of first and second vertical support columns (24, 26) are inclined rearward relative to the vertical axis (50) extending from an apex (52) of the horizontal beam (14).

4. The stand (10, 72) of claim 1, wherein:
the front surfaces (31, 33) of first and second vertical support columns (24, 26) are offset rearward from the vertical axis (50) extending from an apex (52) of the horizontal beam (14).

* * * * *